United States Patent
Smith et al.

(10) Patent No.: US 9,392,419 B1
(45) Date of Patent: *Jul. 12, 2016

(54) METHOD AND APPARATUS FOR ESTABLISHING A CONFERENCE CALL SESSION WITH A WIRELESS DEVICE

(71) Applicant: West Corporation, Omaha, NE (US)

(72) Inventors: Matthew Clinton Smith, Birmingham, AL (US); Herbert Calvin Pyles, Gurnee, IL (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/318,861

(22) Filed: Jun. 30, 2014

Related U.S. Application Data

(63) Continuation of application No. 13/688,510, filed on Nov. 29, 2012, now Pat. No. 8,811,962, which is a continuation of application No. 11/970,588, filed on Jan. 8, 2008, now Pat. No. 8,346,231.

(51) Int. Cl.
*H04M 3/42* (2006.01)
*H04W 4/06* (2009.01)
*H04M 3/56* (2006.01)

(52) U.S. Cl.
CPC .............. *H04W 4/06* (2013.01); *H04M 3/563* (2013.01)

(58) Field of Classification Search
CPC ................................ H04M 3/56; H04M 3/568

USPC ....................................... 455/416; 379/202.01
See application file for complete search history.

(56) References Cited

U.S. PATENT DOCUMENTS

| | | | |
|---|---|---|---|
| 5,619,555 A * | 4/1997 | Fenton ................ | H04M 3/563 379/196 |
| 2002/0091769 A1* | 7/2002 | Drozdzewicz et al. ....... | 709/204 |
| 2006/0046699 A1* | 3/2006 | Guyot et al. ............... | 455/414.1 |
| 2007/0049261 A1* | 3/2007 | Joglekar ..................... | 455/416 |
| 2008/0080692 A1* | 4/2008 | Sylvain ..................... | 379/202.01 |

FOREIGN PATENT DOCUMENTS

EP    1298841 A1 *    4/2003

* cited by examiner

*Primary Examiner* — Omoniyi Obayanju

(57) ABSTRACT

A method and system of establishing a conference call between end users provides initiating a request for at least one invitee to participate in the conference call. The request message is received on a first device prior to time the conference call is scheduled to begin. The message includes a hyperlink which may be activated to autonomously dial a number through the wireless device and connect with a conference call service provider. The conference call may be further accessed by satisfying one or more parameters necessary to enter the conference call. A communication link may be established between the at least one wireless device and the conference call service provider to begin the conference call via one or more autonomous conference call access operations.

20 Claims, 9 Drawing Sheets

Organizer: Rob B.
Subject: Meeting
Location: 888 xxx-xxxx or xxx-xxx-xxxx internationally - passcode xxxxxxxxx Start time: Fri 12/08/2005  06:30  ☐ All day event
End time:   Fri 12/08/2005  07:00

☐ Reminder: 15 minutes  Show time as: ■ Busy

Meeting Workspace...  ☐ This is an online meeting using: Microsoft NetMeeting

CLICK2CALL by following the link below
  CLICK HERE
www.intercall.com/dial#/conference#/passcode#

METHOD AND APPARATUS FOR ESTABLISHING A CONFERENCE CALL SESSION WITH A WIRELESS DEVICE

CROSS-REFERENCE TO RELATED APPLICATION

This application is a continuation from U.S. patent application Ser. No. 13/688,510, filed Nov. 29, 2012, entitled "METHOD AND APPARATUS FOR ESTABLISHING A CONFERENCE CALL SESSION WITH A WIRELESS DEVICE", which is a continuation from U.S. patent application Ser. No. 11/970,588, filed Jan. 8, 2008, entitled "METHOD AND APPARATUS FOR ESTABLISHING A CONFERENCE CALL SESSION WITH A WIRELESS DEVICE", now issued U.S. Pat. No. 8,346,231, issued Jan. 1, 2013, each of which is incorporated by reference herein in its entirety.

FIELD OF THE INVENTION

The present invention is related to conference calls, and more particularly, to simplifying conference call setup and connection procedures used to allow mobile users to connect with the conference call.

BACKGROUND OF THE INVENTION

Users of a telephone or cellular network may arrange a conference call connection between several callers. Generally, a conference call is a voice call set up between two or more users that other users may also join to establish a live voice call between three or more participants. During a conference call every participating user can normally talk, and at a minimum, hear the voices of other participants. A conference call is a useful tool by which it is possible to arrange telephone meetings quickly and easily.

To participate in a conventional conference call, a user may dial a first number of a conference call service phone number, enter a second number on the touch pad of the phone to identify the conference call by a conference call code and/or may even enter a third number which may represent a passcode.

A conference call begins by establishing a telephone connection between one or more of the intended participants. A user may dial into a third party conference call service and wait for others to join the same conference call. Alternatively, one of the current participants may open a new telephone connection by calling another participant. These processes may be repeated numerous times until all participants have joined the conference call.

In another example of a conventional conference call, the calling party may desire to have more than one called party listen to the audio portion of the call without being able to communicate with the other parties. A conference call may be designed to either allow the called party to participate during the call, or instead, the called party merely listens in on the call and cannot speak which is referred to as an audio teleconference (ATC).

Conference calls may be designed to allow the calling party (call initiator or host) to call other participants and add them to the group of conference call participants. In some cases, the participants may be able to call into the conference call themselves without being called first. A participant may connect to a conference call by dialing into a conference bridge which may be a particular type of conference call hardware device that links telephone lines together, or a third party service that performs the bridging of participants.

Certain conference call service companies may offer a specialized service for conference calls. These service providers maintain the conference bridge, and provide the phone numbers and access codes necessary to access the conference call.

Businesses use conference calls daily to meet with remote parties, both internally and outside of their company. Common applications are client meetings or sales presentations, project meetings and updates, regular team meetings, training classes and communication to employees who work in different locations. Conference calling is viewed as a primary means of cutting travel costs and allowing workers to be more productive by not having to go out-of-office for meetings.

Conference calls are increasingly being used with web conferences, where presentations or documents are shared via the internet to complement the conference call. Conference calls are also beginning to cross over into the world of podcasting and social networking, which in turn offers new kinds of live interaction. Live streaming or broadcasting of conference calls allows a larger audience access to the call without dialing in to a bridge. In addition, organizers of conference calls can publish a dial-in number alongside the audio stream, creating potential for audience members to dial in if they wish to interact with the other group participants.

Conference calls can also be used for entertainment or social purposes, such as the party line or a group call. People call in to a specified telephone number, and are connected to conversations with other callers. This serves as a way to talk with and perhaps, subsequently, meet new people. However, conference calls are most commonly used by businesses.

In practice, the procedures described above for establishing a conference call may be slow and tedious. For example, a user may have to remember the telephone number of the conference call service, a conference call identification number, and in addition, may also require username and password information. Furthermore, these procedures may require conference call participants to have prior knowledge of the system operation to understand how the conference call operates. Many telephone users are not familiar with how to setup the conference call due to lack of experience with such services.

Conventional wireline and cellular telephones do not readily present conference call features to the users allowing them to identify with these types of services. Due to the difficulties related to establishing a conference call, the use of conference calls continues to be less common, although, in certain situations it would be clearly more useful and appropriate than a traditional telephone call.

New and advanced methods and applications for arranging conference calls may increase the chances that such services are used. Additionally, arranging a conference call to be easily and efficiently set up and used by users of a cellular telephone network may increase the likelihood of user's employing conference call services.

SUMMARY OF THE INVENTION

The present invention provides a system and method to arrange a conference call to be easily and efficiently set up and used by users of all common types of communication peripheries including a mobile communications device.

An example embodiment of the present invention provides a method of establishing a conference call between at least two users, at least one of the two users connecting to the conference call via a wireless device. The method includes receiving a message on the at least one wireless device prior to time the conference call is scheduled to begin, the message containing a hyperlink, activating the hyperlink, autonomously dialing a number on the wireless device to connect with a conference call service provider, and providing one or more parameters necessary to enter the conference call, said dialing and parameter information required to enter the conference call being provided as a result of the activating of the hyperlink, and establishing a communication link between the at least one wireless device and the conference call service provider.

Another example embodiment of the present inventive concept includes a system configured to establish a conference call that includes at least two users, at least one of the two users connecting to the conference call via a wireless device, and receiving a message on the at least one wireless device prior to time the conference call is scheduled to begin, the message containing a hyperlink, and a conference call service provider configured to provide a conference call service to that at least one wireless device, the at least one wireless device activating the hyperlink and autonomously dialing a number to connect with the conference call service provider and providing one or more parameters necessary to enter the conference call, said dialing and parameter information required to enter the conference call being provided as a result of the activating of the hyperlink, and establishing a communication link between the at least one wireless device and the conference call service provider.

Yet another example embodiment of the present inventive concept includes a method of establishing a conference call between at least two users, at least one of the two users connecting to the conference call via a wireless device, the method including initiating a conference call setup application which identifies the at least two users, said conference call application accessing at least one pre-stored conference call related parameter of at least one the two users, the at least one pre-store conference call parameter being accessed from a memory, sending a message to the at least one wireless device, the message including the at least one pre-stored user conference call parameter, and a conference call confirmation request requesting a response from the at least one wireless device user regarding conference call participation, receiving the message at the at least one wireless device and submitting feedback from the at least one wireless device regarding conference call participation, updating conference call status information that the user has submitted feedback regarding the conference call participation, said updating creating at least one reminder message to be transmitted to the at least one wireless device prior to time the conference call is scheduled to begin, sending said reminder message to the at least one wireless device prior to the time the conference call is scheduled to begin, and autonomously providing at least one parameter necessary to connect to the conference call from the at least one wireless device.

BRIEF DESCRIPTION OF THE DRAWINGS

FIG. 6 illustrates an example email application integrated with a conference call setup application;

DETAILED DESCRIPTION OF THE INVENTION

Telecommunications systems enable parties to communicate in a call session which connects telecommunications terminals together. Terminals may include wireline telephony devices, mobile/cellular devices, and other variations of communication devices which may communicate over a public switched telephone network, wireless communications network and/or voice over an internet protocol network (VoIP).

Figure 1:
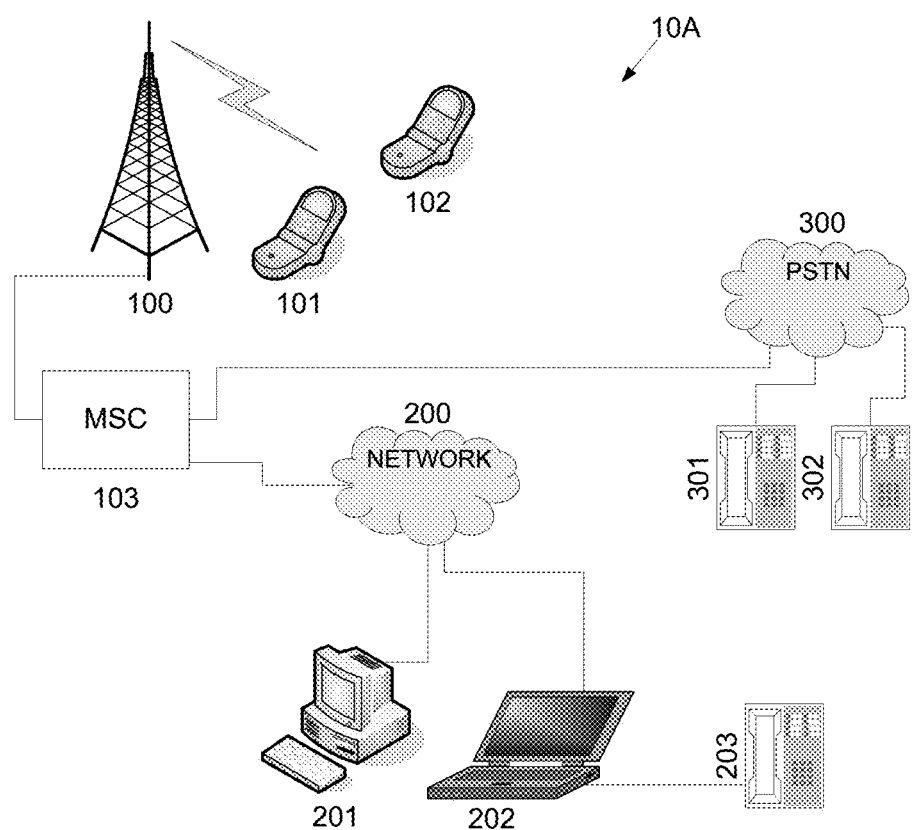
FIG. 1 illustrates an example of an integrated communication systems network.

FIG. 1 illustrates an integrated communications network 10A. The network includes a base station 100 coupled to a mobile switching center (MSC) 103, mobile terminals 101 and 102, network cloud 200, personal computers 201 and 202, a VoIP telephone 203, and PSTN 300 with wireline telephone terminals 301 and 302. In the example communications network 10A, all the communication devices, 101, 102, 201, 202, 203, 301 and 302, may communicate voice and other forms of data in real-time.

It may be desirable to establish a conference call between two or more of the above described communication devices. If, for example, the wireless communications device 101 is selected to participate in a conference call while moving about freely, the user of the wireless communications device 101 may benefit from one or more of the conventional conference call operations being simplified, eliminated and/or handled in a backend software application used to accommodate the wireless mobile terminal 101.

Wireless telecommunications providers offer services, such as, short message service (SMS) messages which have been established to send messages to subscribers of wireless communications services. Subscribers may use their mobile terminal 101 to send and receive SMS messages to and from another mobile terminal 102.

The SMS message may be used to transfer conference call setup information to the mobile user 101. In addition to the SMS message protocol, the push protocol may also be used to send the wireless user 101 an email prior to or in addition to connecting the wireless user 101 to the conference call. Push email is a widely accepted email protocol used with wireless handset devices, such as, wireless terminal 101.

Figure 2:
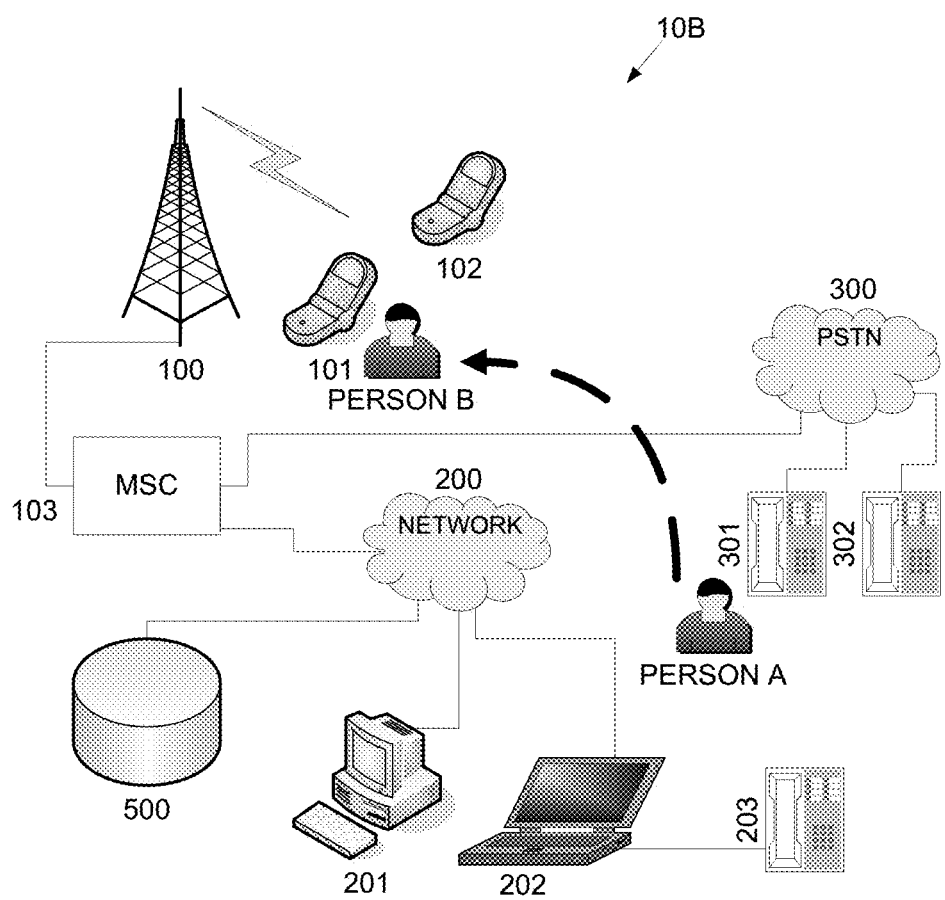
FIG. 2 illustrates another example of an integrated communication systems network that includes a conference call information storage memory device.

FIG. 2 illustrates an example integrated network 10B setup for providing access to a conference call system. All like reference numerals of all drawings may refer to like components. User information of potential conference call invitees may be stored in a conference call application memory 500, and may be recalled from memory 500 when establishing a conference call. In addition, new user profile information may be input into the memory 500 during a conference call setup operation. Previously stored user profile information may be accessed from the memory 500, on an as needed basis, and placed into a conference call application program.

In an example conference call setup operation, assume, for example, a call initiator person A desires to setup a conference call and invite person B of mobile device 101, if person B's information is pre-stored in memory 500, one or more portions of person B's conference call information may be recalled by host person A during the initiation of a conference call setup operation. For example, the conference call host person A may enter the intended invitee's user name "person B" into a database application associated with memory location 500, and the remainder of person B's information may be automatically recalled for convenience. Once a host has selected one or more invitees and has obtained the necessary information, the conference call may be scheduled for a particular date and time.

Referring to FIG. 2, the conference call application allows a landline and/or mobile user to enter the conference call. The conference call information may be sent to the user automatically via electronic mail (email) or a similar form of message transfer, such as, text message or instant messaging via any of the commonly used protocols, short messaging services (SMS) etc.

Reminder messages may also be sent to the user subsequent to the conference call being scheduled. For instance, a first conference call message may be sent to one or more of the invitees immediately after the conference call has been scheduled. The first message may inquire whether the invitee intends to participate in the conference call at a proposed time. Further messages may be sent to remind the invitees of the date and time of the call, such as, the day before, hour before or even minutes before the conference call is scheduled to begin.

Figure 3:
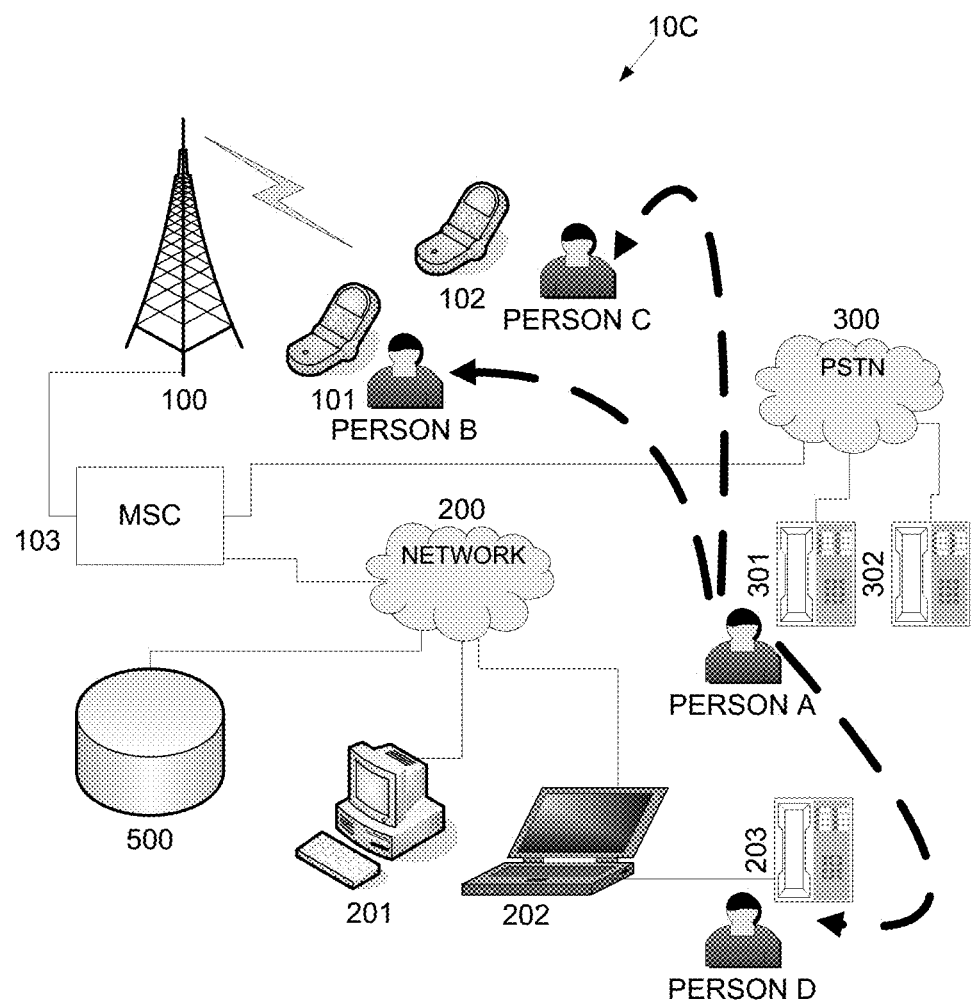
FIG. 3 illustrates yet another example of an integrated communication systems network that includes a conference call information storage memory device.

FIG. 3 illustrates an example integrated network 10C where a conference call is being initiated by a host Person A to multiple invitees located in various different networking environments. For example, Persons B and C are communicating in a wireless network via wireless devices 101 and 102. Person D is located across a VoIP platform to an internet phone 203 connected to a computing device 202.

When Person A initiates a conference call and sets up a list of intended recipients (e.g., Persons B, C and D) the user profile information, which may be pre-stored in memory 500, may be used to autopopulate the conference call software application with user profile information of the identified recipients. Once the correct individual's profiles have been recalled from memory 500, a uniform resource locator (URL) and/or hyperlink may be created and immediately sent to the intended participants for conference call access and/or confirmation purposes. The URL and/or hyperlink may contain one or more pieces of information of the user profile information stored in memory 500.

Upon the participant's acceptance of the conference call, the call may be automatically bridge-dialed to the intended recipients when the conference call is scheduled to begin. The conference call information may be sent to the user automatically via electronic mail (email) or a similar form of message transfer, such as, text message or instant messaging via any of the commonly used protocols, short messaging services (SMS) etc.

Prior to the call beginning, a URL link and/or hyperlink may be sent from the application database memory 500 to the user's computer or mobile device. The URL and/or hyperlink may be included in an email or text message or may invoke a web browser application to display the URL and/or hyperlink with an option to click on the URL and/or hyperlink link to enter the conference call.

A single click on the URL and/or hyperlink displayed on the invitee's mobile device may validate the invitee's conference call user information, password, and/or other information required to connect the user to the conference call, including dialing the necessary conference call number and selecting to correct conference call code. The URL and/or hyperlink may be designed to offer a single acceptance option allowing an invitee to click on the URL and/or hyperlink and enter to conference call without any other user performed selection operations.

After setting up a conference call, the URL and/or hyperlink may be automatically generated via the backend of the conference call software application. The URL and/or hyperlink may be stored for later use and may be re-sent at predetermined intervals via email or other communication mediums as a reminder to participate in the conference call. Subsequent invitations not initially generated during the conference call setup operation may be subsequently generated via the URL and/or hyperlink, and may be attached to or placed in the email to offer the invitee an opportunity to connect to the conference call.

The URL and/or hyperlink may be generated according to a standard naming convention to include the website online application homepage or related link. The naming convention should be an agreed upon format between conference call software applications and integrated third party conference call providers.

Figure 4:
FIG. 4 illustrates an example of a conference call setup application.

FIG. 4 illustrates a sample screenshot of a conference call setup user interface page. The page may be accessed via the web and/or a software program package. To initiate a conference call the host may enter one or more parameters (conference number, passcode, phone number, device model etc.) into the conference call setup page. Alternatively, the information may be auto-populated and the information retrieved from memory 500 based on user profile information.

Referring to the components of the sample screenshot conference call setup user interface page 401 of FIG. 4. Features of this page include a conference number drop down list to select a number that the recipients will be sent in the reminder messages (i.e., SMS messages with a single click to call option). Multiple numbers may be supported which include toll free numbers, international numbers etc. The passcode textbox represents the passcode that will also be sent in the reminder SMS message. The phone number represents the phone number that the SMS alert will be sent to (i.e., the user's telephone number). The device model may also be selected so that certain features of participating mobile device models may be tracked and used if the model supports certain conference call features.

FIG. 4 also illustrates boxes to designate the time, date and alert options prior to sending the conference call invitation. In another example, a user may click on the "Call Me" option or the "SMS Alert" option at the top of the page. The "Call Me" option will allow the user to specify whether they would prefer to be called automatically when the conference call is scheduled to begin or would rather receive an alert with the click to call link that requires a user response in order to enter the conference call. If a user selects the "Call Me" option, they will be presented with a similar conference call setup page except they will not be required to see the conference call number, passcode, device model or alert fields.

Figure 5:
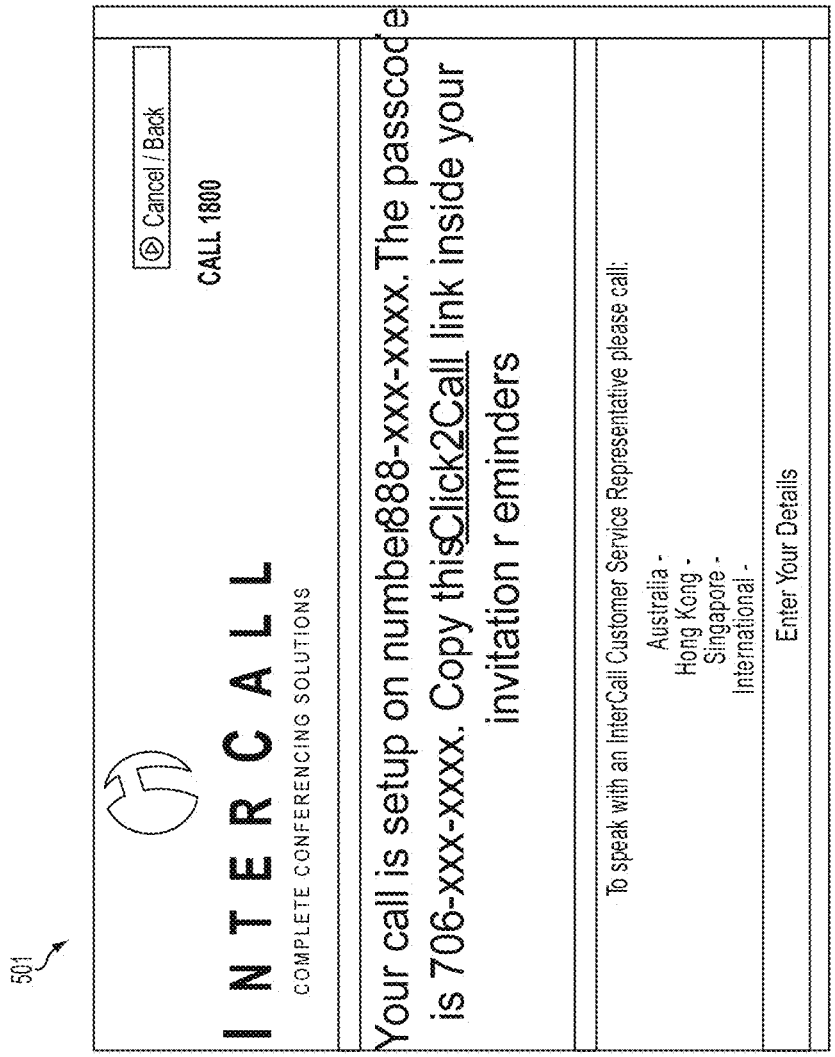
FIG. 5 illustrates another example of a conference call setup application.

FIG. 5 illustrates a confirmation receipt page 501 which is generated once the conference call setup page of FIG. 4 has been completed. A "click to call" link is generated based on the conference call setup information. The link may then be easily forwarded to invitees and accessed via the host of the conference call. The same or a similar link may be used for the reminder messages sent to the invitees.

FIG. 6 illustrates the click to call conference call setup page 601 adapted to an email software package (i.e., Microsoft Outlook etc.). An email may be auto-generated when the host initiates the conference call and designates the invitees to receive the email message. The conference call information may be further integrated to autonomously access the calendar features of the email software package. The time and date of the conference call may be automatically entered into the calendar of the email package to provide further assurance of the participants' knowledge of the time and date of the conference call.

Referring to FIG. 6, the "click-to-call" feature may be adapted for use with an email application, such as, Microsoft Outlook. For example, assuming a user receives an email through Microsoft Outlook from his/her colleague. The user selects the inbox of Microsoft Outlook and opens up the email. The email contains a request for a conference call with his/her company. The user may click on a highlighted accept option included in the email as a live link. The user may also wish to click on the calendar so he/she will be able to see the date and time for the conference call which may be set automatically.

Once the user clicks on the "click-to-call" link in the email the link will open up a conference call software application registration page. The conference number and passcode will be automatically displayed on the user's screen. The user may, if necessary, select a country and/or key in his/her mobile number. The user may want to check the compatibility of their phone by accessing a test feature that checks whether his/her phone can receive WAP messages by selecting the handset type from a feature offered via the software application registration page.

The user may customize their user preferences by selecting an alert preference that designates the time and interval before he/she will be alerted that the conference call is about to being (i.e., five minutes prior to conference call is scheduled to begin). These options may be saved and stored in the memory 500 associated with the conference call software application.

When the conference call is five minutes from starting, an SMS alert may be sent to the user's mobile device. When the user accesses the SMS reminder the user will be given a "click here" or "click-to-call" live link which when selected will access a WAP link associated with the SMS message. The WAP link will lead the user to join the conference call via one or more autonomous operations necessary to enter the conference call. For example, clicking the link will automatically start dialing the number to the conference call.

When the user is dialed in to the conference call service, the user may need to enter a passcode before the conference call access operations are complete. The user passcode information may be stored in the user's phone and selected via a pre-stored passcode dialing feature which further eases the information needed to access the conference call.

Figure 7:
FIG. 7 illustrates an example conference call message display of a wireless communications device.

FIG. 7 illustrates an example wireless telecommunications device 102 that may be adapted to receive confirmation of the conference call. The push protocol may be used to provide the user of the wireless device with the capability to receive the conference call confirmation or conference call reminders without any user action. Furthermore, the link may be sent to the user of the wireless device while the user is moving and is unable to initiate the conventional conference call setup procedures.

In operation, when the user clicks on the link it will take their browser to a conference call connection setup page as illustrated in FIG. 4. The information in the setup page may autopopulate. Alternatively, the user would be permitted to enter or change their final details themselves (e.g. phone number, device type, etc). At the time of the conference call, the conference call connection setup platform may generate an HTTP request to the third party conference call backend system which will place a call to the end user's phone automatically joining them into the conference.

Push email or push SMS alerts containing conference call details may be generated automatically and forwarded to conference call invitees. The reminders may include guidance features that instruct the user what number to dial or instead when to click on the "click to call" link. Certain mobile devices will support automatic dialing and passcode entering features which may be integrated into the operations performed when clicking on the "click to call" link.

Certain example parameters that may be input by the user and compiled by the conference call software application are discussed in further detail below.

Parameter ConfNumber[n] (e.g. ConfNumber1, ConfNumber2, etc.) may be used to represent the conference number the user must dial. The [n] value should be replaced by a number (e.g. 1, 2, 3, 4, etc.) to represent the alternative conference call numbers that can be used. For example, 1 could represent a toll free number, 2 could represent an international number, etc. A minimum of one ConfNumber1 must be supplied, an example may be represented by ConfNumber1=8886986934.

Parameter ConfNumberDesc[n] (e.g. ConfNumberDesc1, ConfNumberDesc2, etc.) may be used to represent the description to be used for each ConfNumber supplied. This is an optional field. If no values are supplied, then a description will not appear on the conference call software setup application or conference call website. An example of a description may be ConfNumberDesc1=Toll+Free, which implies that a particular conference call number is a "Toll Free" number.

Time may be used to represent the time the conference will start. The time may be represented in a 24 hour format, for example: Time=22:15.

Date may be used to represent the month, day and year the conference call is scheduled to begin. An example format for the date may be "yyyymmdd" which represents a four digit year, two digit month and two digit day of the month. An example date may be represented by: Date=20050927, which represents Sep. 27, 2005.

The details of the URL web link and/or hyperlink format may be important for integration purposes with web based applications and third party compatibility. The URL and/or hyperlink may include the confNumber[n](e.g. ConfNumber1, ConfNumber2, etc) that the user must dial. The URL and/or hyperlink may further include the optional ConfNumberDesc1=Toll+Free, the time the conference will start, and the date the conference will start. An example URL and/or hyperlink for a conference call that begins on the 29$^{th}$ of September at 12:30 pm with two dial in numbers would be: http://216.237.125.146/ClickToCall/
Register.aspx?ConfNumber1=8886986934&ConfNumber
Desc1=Toll+
Free&ConfNumber2=7071142599&ConfNumberDesc2=
International&Passcode=123456Time=1230&Date=
20050929.

"Click to call" alerting systems may be adapted to automatically send out reminders before a conference starts. The reminders may include "Call number" (or click to call where supported), "Participant ID", and/or "Time to call Provisioning interface" where call hosts enter details regarding SMS/LCS IM alerts for users.

Certain features associated with the "Click to call" option for users with more recent and up to date technological phones may enable mobile users to instantly connect and talk with a group of people as quickly and easily as making a normal point-to-point phone call. User initiated conference calls may be accessed by dialing one number, or in some cases no numbers. The conference call access options may not require entering in conference codes and leader PIN codes or passcodes. Managing contact lists and/or group lists stored in memory 500 or on a mobile device may provide the ability to send pre-meeting notices/invitations effortlessly via SMS and/or email notifications.

Figure 8:
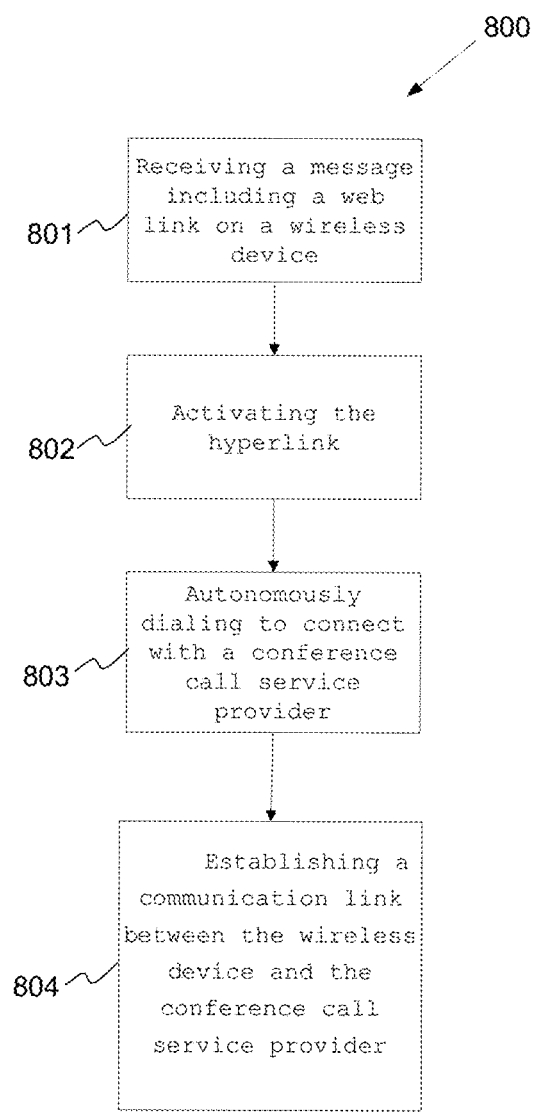
FIGS. 8 and 9 illustrate example conference call setup operations.

FIG. 8 illustrates an example method 800 according to the present inventive concept. A message is received on a user device (operation 801). The message includes a hyperlink which may be activated by the user of the user device (operation 802). Upon activation of the hyperlink a number is autonomously dialed to connect with a conference call service provider (operation 803). Next, a communication link is established between the wireless device and the conference call service provider (operation 804).

Figure 9:
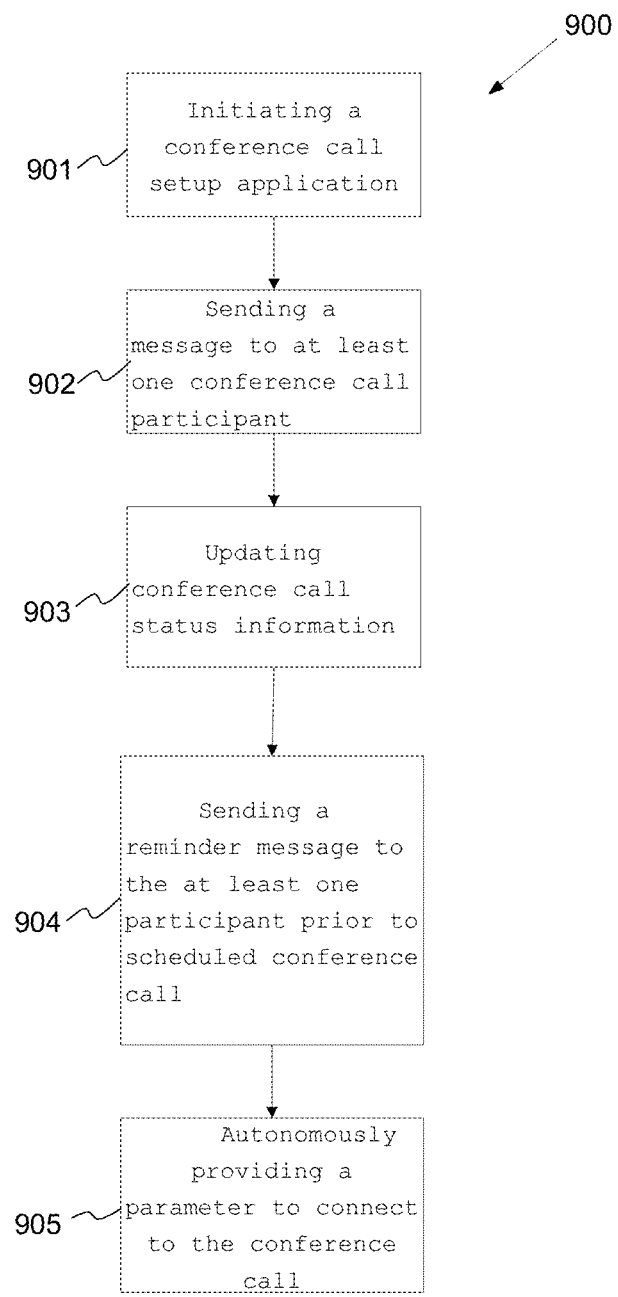

FIG. 9 illustrates an example method 900 according to the present inventive concept. A conference call setup application is initiated by a conference call initiator (operation 901). A message is then sent to at least one conference call participant (operation 902). Then, conference call status information is updated at a remote location (operation 903). Next, a reminder message is sent to at least one of the intended participants (operation 904). Lastly, at least one parameter necessary to connect to the conference call is autonomously provided to the conference call service to connect with the conference call (operation 905).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
   checking a compatibility of a wireless device by checking whether the wireless device is configured to receive at least one wireless application protocol message;
   receiving the at least one wireless application protocol message on the wireless device prior to a time a conference call is scheduled to begin, the message comprising a hyperlink;
   requesting a conference call confirmation response from the wireless device regarding conference call participation;
   submitting feedback from the wireless device regarding the conference call participation, wherein the feedback comprises modifications to a phone number of the wireless device and a device type of the wireless device;
   autonomously dialing a number on the wireless device to connect with the conference call and providing one or more parameters to enter the conference call; and
   connecting the wireless device to the conference call.

2. The method of claim 1 further comprising:
   validating at least one of the invitee's conference call user information and password to connect the user to the conference call when activating the hyperlink.

3. The method of claim 2, further comprising at least one of:
   dialing the conference call number and selecting a correct conference call code.

4. The method of claim 2, further comprising:
   activating the hyperlink via a user clicking operation.

5. The method of claim 1, wherein the message comprises an email sent via push protocol.

6. The method of claim 1, wherein the hyperlink is sent to the user during a predetermined time interval prior to the pre-scheduled conference call.

7. The method of claim 1, wherein the message is received via short message service protocol.

8. The method of claim 1, wherein the parameters comprise at least one of a conference call identification number and a conference call passcode.

9. The method of claim 1, wherein an established communication link begins the conference call.

10. A method, comprising:
    checking a compatibility of a wireless device by checking whether the wireless device is configured to receive at least one wireless application protocol message;
    receiving the wireless application protocol message at the wireless device, the message comprising at least one pre-stored user conference call parameter and a conference call confirmation request requesting a response from the wireless device regarding conference call participation;
    submitting feedback from the wireless device regarding the conference call participation, wherein the feedback comprises modifications to a phone number of the wireless device and a device type of the wireless device;
    sending a reminder message to the wireless device prior to the time the conference call is scheduled to begin;
    autonomously dialing a number on the wireless device to connect with the conference call and providing the at least one pre-stored user conference call parameter to enter the conference call; and
    connecting the wireless device to the conference call.

11. The method of claim 10, further comprising:
    confirming the reminder message on the wireless device prior to connecting to the conference call.

12. The method of claim 10, wherein the reminder message comprises a hyperlink.

13. The method of claim 11, wherein the confirming comprises clicking on the hyperlink.

14. The method of claim 12, wherein the hyperlink comprises at least one parameter to connect the conference call embedded in the hyperlink.

15. The method of claim 12, wherein the hyperlink is sent to the wireless device during a predetermined time interval prior to the pre-scheduled conference call.

16. The method of claim 12, wherein the message is received via short message service protocol.

17. The method of claim 10, wherein an established communication link begins the conference call.

18. The method of claim 10, further comprising:
    updating conference call status information indicating that the user has submitted the feedback regarding the conference call participation.

19. The method of claim 18, further comprising:
    creating at least one reminder message to be transmitted to the wireless device prior to a time the conference call is scheduled to begin.

20. A non-transitory computer readable storage medium comprising instructions that, when executed, are configured to cause at least one processor to:
    check a compatibility of a wireless device by checking whether the wireless device is configured to receive at least one wireless application protocol message;
    receive the at least one wireless application protocol message on the wireless device prior to a time a conference call is scheduled to begin, the message comprising a hyperlink;
    request the conference call confirmation response from the wireless device regarding conference call participation;
    submit feedback from the wireless device regarding the conference call participation, wherein the feedback comprises modifications to a phone number of the wireless device and a device type of the wireless device;
autonomously dial a number on the wireless device to connect with the conference call and provide one or more parameters to enter the conference call; and
connect the wireless device to the conference call.

* * * * *